United States Patent
Patino-Studencka et al.

(10) Patent No.: US 8,363,768 B2
(45) Date of Patent: Jan. 29, 2013

(54) METHOD AND APPARATUS FOR ESTIMATING CLOCK DEVIATIONS, FOR VIRTUAL SYNCHRONIZATION OF FREE-RUNNING CLOCKS AND FOR DETERMINING THE POSITION OF A MOVABLE OBJECT

(75) Inventors: Lucila Patino-Studencka, Nuremberg (DE); Andreas Eidloth, Erlangen (DE); Joern Thielecke, Erlangen (DE)

(73) Assignees: Fraunhofer-Gesellschaft zur Foerderung der Angewandten Forschung E.V., Munich (DE); Friedrich-Alexander-Universitaet-Erlangen-Nuernberg, Erlangen (DE)

( * ) Notice: Subject to any disclaimer, the term of this patent is extended or adjusted under 35 U.S.C. 154(b) by 307 days.

(21) Appl. No.: 12/725,276

(22) Filed: Mar. 16, 2010

(65) Prior Publication Data

US 2010/0266003 A1 Oct. 21, 2010

(30) Foreign Application Priority Data

Mar. 19, 2009 (EP) ..................... 09003962

(51) Int. Cl.
*H04L 7/00* (2006.01)
(52) U.S. Cl. ...................... 375/354; 375/355
(58) Field of Classification Search .................. 375/354
See application file for complete search history.

(56) References Cited

U.S. PATENT DOCUMENTS

| | | | | |
|---|---|---|---|---|
| 5,912,644 A * | 6/1999 | Wang | ........................... | 342/457 |
| 6,380,891 B1 * | 4/2002 | Yamashita | ............... | 342/357.58 |
| 7,382,804 B2 * | 6/2008 | Alapuranen et al. | .......... | 370/509 |
| 7,653,003 B2 * | 1/2010 | Stine | ............................. | 370/252 |
| 8,102,784 B1 * | 1/2012 | Lemkin et al. | ................ | 370/255 |
| 8,120,526 B2 * | 2/2012 | Holder | ......................... | 342/140 |
| 2003/0156063 A1 * | 8/2003 | Spilker et al. | ................ | 342/464 |
| 2004/0108954 A1 * | 6/2004 | Richley et al. | ............... | 342/387 |
| 2004/0183723 A1 * | 9/2004 | Bhatia et al. | ............ | 342/357.15 |
| 2005/0030229 A1 * | 2/2005 | Spilker, Jr. | ..................... | 342/385 |
| 2005/0190784 A1 * | 9/2005 | Stine | ............................. | 370/445 |
| 2006/0029009 A1 | 2/2006 | Alapuranen | | |
| 2006/0029010 A1 * | 2/2006 | Belcea | ......................... | 370/310 |

(Continued)

OTHER PUBLICATIONS

D. Yun and C. Kee, "Centimeter accuracy stand-alone indoor navigation system by synchronized pseudolite constellation," Sep. 2002, Proceedings of the 15th International Technical Meeting of the Satellite Division of the Institute of Navigation ION GPS, pp. 213-225.

(Continued)

*Primary Examiner* — David Ometz
*Assistant Examiner* — Santiago Garcia
(74) *Attorney, Agent, or Firm* — Michael A. Glenn; Glenn Patent Group

(57) ABSTRACT

In a method for estimating a deviation between a free-running transmitter clock and a reference clock, at a receiver stationary with respect to a transmitter, a transmitter signal generated by the transmitter on the basis of the transmitter clock is received. On the basis of the reference clock, a time of arrival of the transmitter signal and a beat phase of the transmitter signals carrier is determined. On the basis of a clock error model, the time of arrival and the beat phase, the deviation between the transmitter clock and the reference clock is estimated. The clock error model is derived by fitting a correlation function of a stochastic model to a measured auto correlation function of the transmitter clock. Deviations for a plurality of transmitters may be estimated and the transmitters may be virtually synchronized based on the estimations.

10 Claims, 9 Drawing Sheets

U.S. PATENT DOCUMENTS

| | | | |
|---|---|---|---|
| 2006/0103535 A1* | 5/2006 | Pahlaven et al. | 340/572.1 |
| 2007/0040739 A1* | 2/2007 | Small | 342/357.09 |
| 2007/0041427 A1* | 2/2007 | Small | 375/145 |
| 2007/0060079 A1* | 3/2007 | Nakagawa et al. | 455/131 |
| 2008/0082266 A1* | 4/2008 | Bye et al. | 701/214 |
| 2008/0129591 A1* | 6/2008 | Lamance et al. | 342/357.12 |
| 2008/0244707 A1* | 10/2008 | Bowser et al. | 726/4 |
| 2008/0317187 A1* | 12/2008 | Waheed et al. | 375/376 |
| 2009/0002238 A1* | 1/2009 | Small | 342/464 |
| 2009/0079633 A1* | 3/2009 | Ward | 342/387 |
| 2009/0147806 A1* | 6/2009 | Brueckheimer | 370/503 |
| 2009/0167607 A1* | 7/2009 | Holder | 342/453 |
| 2009/0243934 A1* | 10/2009 | Ameti et al. | 342/465 |
| 2010/0073229 A1* | 3/2010 | Pattabiraman et al. | 342/357.09 |
| 2011/0092223 A1* | 4/2011 | Nakagawa et al. | 455/456.1 |

OTHER PUBLICATIONS

J. Barnes, C. Rizos, J. Wang, D. Small, G. Voigt, and N. Gambale, "High Precision Indoor and Outdoor Positioning using LocataNet," Jun. 2004, Journal of Global Positioning Systems, vol. 2, No. 2, pp. 73-82.

L. Galleani, L. Sacerdote, P. Tavella, and C. Zucca, "A mathematical model for the atomic clock error," Jun. 2003, Metrologia-Berlin-, vol. 40, No. 3, pp. 257-264.

J. Wright, "GPS Composite Clock Analysis," 2008, Int'l Journal of Navigation and Observation, vol. 2008, Article ID 261384, 8 pages.

F. Gonzalez and P. Waller, "Short term GNSS clock characterization using One-Way carrier phase," May 29-Jun. 1, 2007, IEEE Frequency Control Syposium, pp. 517-522, Geneva.

P. Daly and I. Kitching, "Characterization of NAVSTAR GPS and GLONASS on-board clocks," Jul. 1990, Aerospace and Electronic Systems Magazine, IEEE, vol. 5, No. 7, pp. 3-9.

W. Riley and C. Greenhall, "Power Law Noise Identification Using the Lag 1 Autocorrelation," Apr. 2004, in Proc. 18th European Frequency and Time Forum (Guildford, UK).

T. Parker, "Characteristics and Sources of Phase Noise in Stable Oscillators," May 1987, 41st Annual Frequency Control Symposium, pp. 99-110.

M. Grewal and A. Andrews; Kalman Filtering: Theory and Practice Using MATLAB; Jan. 2001, Wiley.

Mouly M; Dornstetter J-L: "The Pseudo-Synchronisation, a Costless Feature to Obtain the Gains of a Synchronised Cellular Network"; Nov. 1, 1991;MRC Mobile Radio Conference, pp. 51-55, XP000391318.

Carpenter R, et al.: "A stable clock error model using coupled first and second-order gauss-markov processes"; Dec. 31, 2008; Advances in the Astronautical Sciences—Space Flight Mechanics 2008—Proceedings of the AAS/AIAA Space Flight Mechanics Meeting 2008 Univelt Inc. US, pp. 1-13, XP002545930.

Nicola Altan, et al.: "Opportunistic Clock Synchronization in a Beacon Enabled Wireless Sensor Network" Sep. 10, 2008, AD-HOC, Mobile and Wireless Networks; Springer Berlin Heidelberg, Berlin, Heidelberg, pp. 15-28, XP019102619 ISBN: 9783540852087.

* cited by examiner

METHOD AND APPARATUS FOR ESTIMATING CLOCK DEVIATIONS, FOR VIRTUAL SYNCHRONIZATION OF FREE-RUNNING CLOCKS AND FOR DETERMINING THE POSITION OF A MOVABLE OBJECT

CROSS-REFERENCE TO RELATED APPLICATION

This application claims priority from European Patent Application No. 09003962.9, which was filed on Mar. 19, 2009, and is incorporated herein by reference in its entirety.

BACKGROUND OF THE INVENTION

Embodiments of the invention relate to a method and an apparatus for estimating deviations between free running transmitter clocks and a reference clock. In embodiments of the invention, the estimated deviations are used to virtually synchronize transmitters using the free-running transmitter clocks. In embodiments of the invention, deviation between a plurality of free-running transmitter clocks and the reference clock is estimated at a stationary receiver, the estimated deviations are sent to a movable object, wherein the movable object uses the estimated deviations and transmitter signals received from the plurality of free-running transmitter clocks to determine its position.

Synchronization is a pivotal element in any accurate positioning system based on time-of-arrival (TOA) or time-difference-of-arrival (TDOA) measurements. There are numerous publications on synchronization strategies for local navigation systems. Most of them build upon complex, fixed infrastructure or intelligent, expensive transmitters, [1] and [2].

A system comprising low-cost free-running transmitters which are virtually synchronized by means of a single, fixed reference station would be a solution. The reference station would then distribute the synchronization parameters wirelessly to the rovers. Obviously, such a solution means that any receiver in the system can adequately model the behavior of the different transmitter clocks. Most published clock error models are particularly suitable for long-term stable accurate clocks [3], [4], [5], [6].

All these models identify the types and determine the parameters of the noise components from plots of the Allan Variance or of the power spectral densities by a method called power-law noise identification which subdivides the plot into regions of different slopes. The parameters extracted from the Allan Variance can be used to set up a random process modeling the clock behavior. A drawback of this method is its limited applicability: some of the noise components are hard to model by a rational transfer function. Moreover, all the mentioned studies focus on the frequency modulate (FM) components: white FM, flicker FM, and random walk FM.

When short-term stability is of interest, phase modulated (PM) components: white and flicker PM noise, if present, are also taken into account. In this case, power-law noise identification by simply reading the noise parameters from the Allan Variance leads to non rational transfer functions.

A different approach to noise identification is based on the autocorrelation function of the phase noise as presented in [7], applied there to any type of noise.

US 2006/029009 A1 discloses a system of measuring the range between nodes in a wireless communications network with one-way data transfer, where each node periodically transmits a message that contains information regarding neighboring nodes from which any prior messages have been received by the transmitting node. A node receives the messages transmitted from neighboring nodes in the network, and records the times of arrival of the received messages. The node receiving those messages can thus determine the respective distances between itself and the neighboring nodes based on the respective time of arrivals of the received messages and the respective information included in the respective messages.

Mouly M; Dornstetter J-L: "The Pseudo-Synchronisation, a Costless Feature to Obtain the Gains of a Synchronised Cellular Network" MRC Mobile Radio Conference, XX, XX, 1 Nov. 1991 (Nov. 1, 1991), pages 51-55, XP000391318, disclose a pseudo-synchronization scheme for a cellular radio telephone system. An accurate knowledge of phase differences between the time basis of different base stations is maintained and each base station stores the time difference with its neighbors. Once known, the time differences are sent to the entity needing them at the moment they need them, for instance to a mobile station when ordered to another cell.

Carpenter R; Lee T: "A stable clock error model using coupled firs and second-order gauss-markov processes" Advances in the Astronautical Sciences—Space Flight Mechanics 2008—Advances in the Astronautical Sciences, Proceedings of the AAS/AIAA Space Flight Mechanics Meeting 2008 Univelt Inc. US, 31 Dec. 2008 (Dec. 31, 2008), pages 1-13, XP002545930, teaches a stable clock error model using coupled first—and second—order gauss-markov processes.

Nicola Altan; Erwin P Rathgeb Ed—David Coudert; David Simplot-RYL, Ivan Stojomenovic: "Opportunistic Clock Synchronization in a Beacon Enabled Wireless Sensor Network" 10 Sep. 2008 (Sep. 10, 2008), AD-HOC, Mobile and Wireless Networks; 20080910 Springer Berlin Heidelberg, Berlin, Heidelberg, page(s) 15-28, XP019102619 ISBN: 9783540852087, teach a clock synchronization in a beacon enabled wireless sensor network consisting of a large number of tiny inexpensive sensor nodes. A time synchronization mechanism based on the usage of a Kalman Filter on a smoothed sequence of measured beacon intervals is proposed. A global clock synchronization is introduced.

SUMMARY

According to an embodiment, a method for estimating a deviation between a free-running transmitter clock and a reference clock may have the steps of: at a receiver stationary with respect to a transmitter, receiving a transmitter signal generated by the transmitter on the basis of the transmitter clock; on the basis of the reference clock determining a time of arrival of the transmitter signal and a beat phase of the transmitter signals carrier; and on the basis of a clock error model, the time of arrival and the beat phase, estimating the deviation between the transmitter clock and the reference clock, wherein the clock error model is derived by fitting a correlation function of a stochastic model to a measured auto correlation function of the transmitter clock.

According to another embodiment, a method for determining a position of a movable object may have the steps of: at the movable object, receiving an estimated deviation between each transmitter clock of a plurality of transmitters and a reference clock of a receiver stationary with respect to the plurality of transmitters and receiving signals generated based on the free-running transmitter clocks from the plurality of transmitters, and calculating the position of the movable object using a time of arrival of the received signals from the plurality of transmitters and transmission times of the received signals corrected by the estimated deviations.

According to another embodiment, an apparatus for estimating a deviation between a free-running transmitter clock and a reference clock may have: a receiver configured to receive a transmitter signal generated by a transmitter stationary with respect to the receiver, on the basis of the transmitter clock; a processor configured to: on the basis of the reference clock, determine a time of arrival of the transmitter signal and a beat phase of the transmitter signals carrier; and on the basis of a clock error model, the time of arrival and the beat phase, estimate the deviation between the transmitter clock and the reference clock, wherein the clock error model is derived by fitting a correlation function of a stochastic model to a measured auto correlation function of the transmitter clock.

According to another embodiment, an apparatus for determining a position of a movable object may have: a receiver configured to receive estimated deviations between each transmitter clock of a plurality of transmitters and a reference clock of a receiver stationary with respect to the plurality of transmitters, and to receive signals generated based on the free-running transmitter clocks from the plurality of transmitters, and a processor configured to calculate the position of the movable object using a time of arrival of the received signals from the plurality of transmitters and transmission times of the received signals corrected by the estimated deviations.

An embodiment may have a movable object having apparatus for determining a position of a movable object as mentioned above.

Another embodiment may have a system having a plurality of stationary transmitters spaced from each other, an apparatus for estimating a deviation between a free-running transmitter clock and a reference clock as mentioned above, which is stationary with respect to the transmitters, and a movable object having apparatus for determining a position of a movable object as mentioned above.

Another embodiment may have a computer program having program code for performing, when running on a computer, a method for estimating a deviation between a free-running transmitter clock and a reference clock as mentioned above.

In embodiments of the invention, a stochastic model is used for estimating the clock deviation. The stochastic model is derived from a measured autocorrelation function. The estimated deviation may be determined by a stationary reference unit and may be distributed to a movable object, representing for a receiver in the system. The mobile object or a plurality of mobile objects (receivers) may use the same model to predict or extrapolate current clock deviations between updates.

Embodiments of the invention are based on the recognition that measured autocorrelation functions for transmitter clocks resemble the autocorrelation function of flicker PM noise and that they are also very similar to correlation functions of second order Markov processes.

In embodiments of the invention, the stochastic model is a second order Markov process and the correlation function of the stochastic model is the correlation function of a second order Markov process. In embodiments of the invention, the deviation is estimated using a Kalman filter, wherein coefficients of the system matrix of the Kalman filter are determined based on the clock error model.

In embodiments of the invention, deviations for a plurality of transmitters are estimated and the estimated deviations for the plurality of transmitters are used to virtually synchronize the plurality of transmitters.

Embodiments of the invention relate to a method for virtual synchronization of free-running transmitters within a local navigation system. The transmitters have free-running oscillators and need no communication with other transmitters within the system. They need not be explicitly connected to a master clock, but a synchronization may be performed in a virtual manner at a reference station.

In embodiments of the invention, estimated deviations between each of a plurality of free-running transmitter clocks and the reference clock are used to virtual synchronize signals, which are generated by the plurality of transmitters based on the free-running transmitter clocks and which are received at a movable object. In this regard, virtual synchronization means that respective transmission times of the signals, which are generated and transmitted based on the free-running clocks, are corrected based on the estimated deviations upon receipt of these signals. In embodiments of the invention, such signals and the estimated deviations are used to calculate the position of a movable object.

In embodiments of the invention, the movable object calculates extrapolated deviations using an estimated or predicted state vector in a state equation of a Kalman filter corresponding to a Kalman filter used in the stationary receiver.

Embodiments of the invention relate to a movable object comprising an apparatus for determining a position of the movable object. Embodiments of the invention relate to a system comprising a plurality of stationary transmitters spaced from each other, an apparatus for estimating the deviation between the free-running transmitter clock and the reference clock for each of the plurality of stationary transmitters, and a movable object.

According to embodiments of the invention, a stationary reference station receives the transmitter signals and calculates the clock deviations using a stochastic model. Subsequently, the reference station transmits these deviations to the mobile receivers (rovers) so that they may correct their data and calculate their positions accordingly. To be more specific, the deviations may be used to correct the transmission times of the signals, which are used at the movable object in calculating the pseudo-distance between the movable object and the transmitter. Between updates from the stationary reference station, the mobile receiver can predict or extrapolate the clock deviations using an equal model.

Accordingly, embodiments of the invention permit for providing a shared time basis for all the components existing within a system so that position calculation becomes possible. According to embodiments of the invention, this is achieved using a stationary reference station, which sends deviation information associated with a plurality of free-running transmitter clocks to a mobile receiver. Thus, the transmitters may be free-running and are not to be synchronized, as in conventional systems, in which explicit synchronization of the transmitters via cables or by using intelligent transmitters is achieved, i.e. communication takes place in both directions between the transmitter and the receiver.

Embodiments of the invention are beneficial in that there is no communication necessary between the transmitters and the transmitters need not perform any complicated calculations. Moreover, low-cost oscillators may be used in the inventive approach. According to embodiments of the invention, the entire synchronization may be performed via radio and, therefore, the cost for the infrastructure may be low.

A communication channel between the reference station and transmitters so as to perform corrections directly at the transmitters, while the reference station is used for monitoring, is not necessary according to the invention.

In the following specification, navigation within local systems will be described as an application of the invention. It is, however, clear for a person skilled in the art that it is feasible to employ the inventive approach for synchronizing other systems, in which receiving units use a common time base or at least a known time base.

BRIEF DESCRIPTION OF THE DRAWINGS

Embodiments of the invention will be described referring to the accompanying drawings, in which.

DETAILED DESCRIPTION OF THE INVENTION

Figure 1:
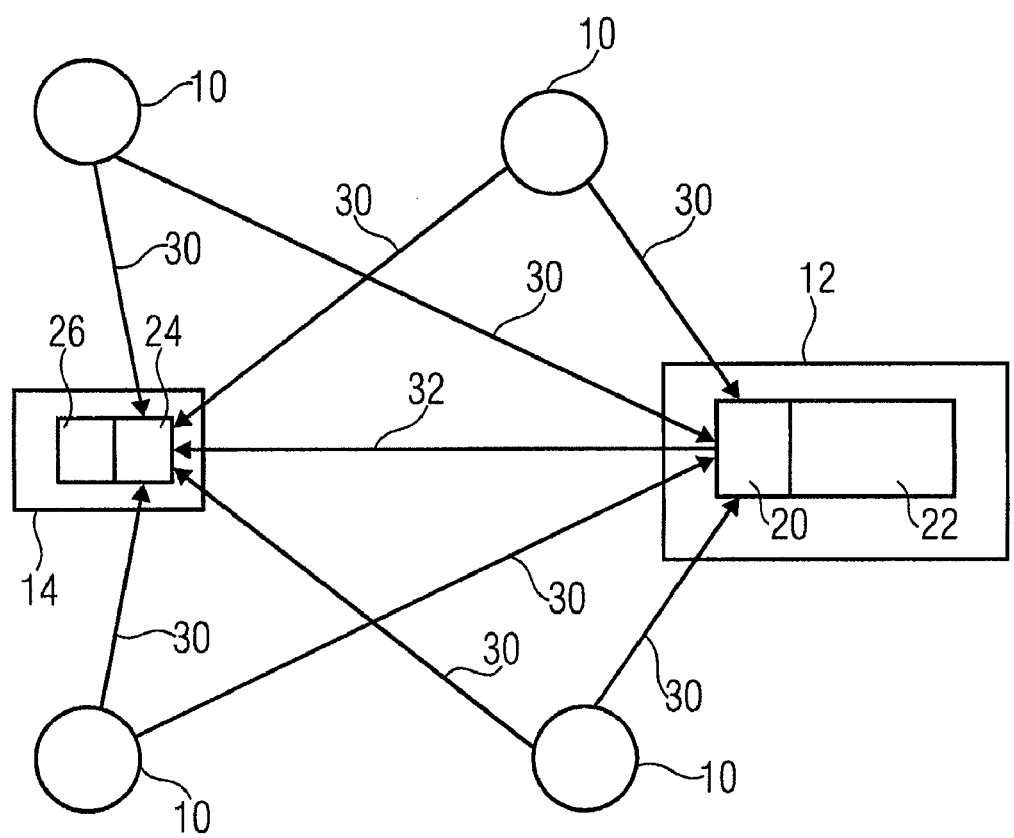
FIG. 1 shows a schematic view of a local navigation system, in which embodiments of the invention may be implemented.

As it is shown in FIG. 1, embodiments of the invention relate to a local microwave locating system comprising a couple of asynchronous transmitters 10, a (unique) receiving reference station 12 and one or more movable objects 14, such as receiving rovers, wherein the positions of the transmitters 10 and the reference station 12 are fixed and known and the position(s) of the movable object(s) are to be determined.

The transmitters 10 may comprise free-running oscillators for providing a free-running transmitter clock and a carrier for transmitter signals 30 sent by the transmitters 10, the carrier having a carrier frequency and a carrier phase. Transmission times of the transmitter signals 30 depend on the free-running transmitter clock.

The stationary receiver station 12 comprises a transceiver 20 and a processor 22. The movable object 14 comprises a receiver 24 and a processor 26.

The transceiver 20 is configured to receive the transmitter signals 30 from the plurality of transmitters 10. The transceiver 20 is further configured to transmit deviation information 32 to the receiver 24 of the movable object 14. The processor 22 is configured to derive the deviation information for each of the transmitters 10 as explained in further detail below.

The receiver 24 is configured to receive signals 30 from the plurality of transmitters 10, which are generated based on the free-running transmitter clocks. The signals may be identical to the transmitter signals received at the stationary unit 12 and, therefore, are provided with the same reference number. In addition, the receiver 24 is configured to receive the deviation information 32 from the stationary unit 12. The processor 26 is configured to calculate the position of the mobile object 14 using the deviation information 32 and the transmitter signals 30.

The processor 26 may be configured to perform time-of-arrival or time-difference-of-arrival measurements to determine the distance between the movable object 14 and at least some of the transmitters 10 in order to calculate the position based thereon.

Generally, the processor 26 may be configured to calculate the distance between the movable object 14 and a respective one of the transmitters using the time of arrival of the signal 30 from the transmitter and the transmission time. In order to virtually synchronize the free-running transmitter, the estimated deviation of the respective transmitter is used to correct the transmission time used to calculate the distance. The transmission time, which is corrected, may be a predefined transmission time known to the movable object or may be a transmission time forwarded to the movable object along with the transmitter signal.

The calculated distances may then be used to calculate the position of the movable object in a known manner.

In the following specification, which relates to an embodiment of the invention, deriving of a stable model for clock deviations of low-cost transmitters is explained. The following specification is subdivided into sections I to V.

Section I presents measurements indicating the predominance of noise components which can be modeled more easily by approximating the autocorrelation function rather than using power-law techniques. Applying such a model, Section II introduces a Kalman filter which estimates the state of a particular transmitter clock. Section III presents the local microwave locating system used as test platform for verifying the algorithms. The use and effectiveness of the clock models are discussed in Section IV. Finally, conclusions are drawn in Section V.

I. STOCHASTIC NATURE OF CLOCK DEVIATIONS

Each transmitter and receiver in the navigation system generates a time base using its own oscillator. Because the oscillators are not ideal, it is natural that some deviations between the time bases of different components appear. These deviations affect the measurements in the navigation system. In this section the relationship between the observables and the clock deviations is derived, the model used for describing the clock deviations is presented. A particular transmitter i uses its own time base to determine the exact time point $t_i$ to send a signal. This signal travels a distance $d_{ri}$ and arrives at the receiver r at time $t_{ri}$, according to the receiver time scale. The transmitter clock deviation $\delta t_i[t]$ is defined as the difference between its time base $t_i[t]$ and a reference time t, which is in this case the receiver time base.

$$\delta t_i[t] = t - t_i[t] \tag{1}$$

Time of arrival measurements at the receiver take the form $$t_{ri} = t_i + \delta t_i[t_{ri}] + \frac{d_{ri}}{c} \tag{2}$$

where $d_{ri}$ corresponds to the distance between transmitter and receiver and c is the speed of light. It was implicitly assumed that the transmitter clock deviation $\delta t_i[t]$ does not change noticeably during the brief period of transmission.

Besides time of arrival (TOA) the receivers in the system measure the carrier beat phase $\phi_{bi}$, i.e. the difference between the receiver phase $\phi_r$ at reception time $t_{ri}$ and transmitter phase $\phi_i$ at transmission time $t^s$ using the receiver time as reference:

$$\phi_{bi} = \phi_r[t_{ri}] - \phi_i[t^s] \tag{3}$$

Both, receiver and transmitter generate the carrier signal with a nominal frequency $f_0$, which gives the relationship between transmitter time $t_i[t]$ and phase $\phi_i[t]$:

$$\phi_i[t^s] = 2\pi f_0 t_i[t^s] \quad (4)$$

Variations in the frequency $f_i[t]$ are the prime reason for the clock and phase deviations of (1) and (3). An ideal behavior of the receiver clocks was assumed, since the transmitter clocks are much cheaper. Using (1) to replace $t_i[t^s]$ in the transmitter phase $\phi_i$, we obtain:

$$2\pi \int_0^{t^s} f_i[t]dt = \phi_i[t^s] = 2\pi f_0(t^s - \delta t_i[t^s]) \quad (5)$$

The receiver phase $\phi_r[t_{ri}]$ takes the form $$\phi_r[t_{ri}] = 2\pi f_0 t_{ri} = 2\pi f_0\left(t^s + \frac{d_{ri}}{c}\right) \quad (6)$$

replacing time of reception $t_{ri}$ by time of transmission $t^s$ plus travel time $d_{ri}/c$. Inserting (5) and (6) into (3) the beat phase takes the form $$\phi_{bi}[t_{ri}] = 2\pi f_0 \delta t_i[t^s] + 2\pi f_0 \frac{d_{ri}}{c} \quad (7)$$

The variation of the beat phase corresponds to the variation of the transmitter clock if the distance $d_{ri}$ between transmitter and receiver remains constant and the speed of light does not vary. Differentiation with respect to time then yields (assuming again $\delta t_i[t^s] = \delta t_i[t_{ri}]$, i.e. slowly changing clocks):

$$\frac{\partial \phi_{bi}}{\partial t} = 2\pi f_0 \frac{\partial \delta t_i}{\partial t} \quad (8)$$

The assumption of constant distance holds true for the reference receiver and the transmitters since they are static.

The relationships shown in (2), (7) and (8) demonstrate that both, TOA and phase measurements on a static receiver provide information about the behavior of the transmitter clocks. Such measurements will be used in Section II to determine clock deviations.

In (9) below, based on single phase differences an approximation of the derivative in (8) is given. The upper index k indicates that the beat phase is sampled at discrete time points.

$$\frac{\partial \phi_{bi}}{\partial t} \approx \frac{\Delta \phi}{\Delta t} = \frac{\phi_{bi}^k - \phi_{bi}^{k-1}}{t_{ri}^k - t_{ri}^{k-1}}. \quad (9)$$

Figure 2:
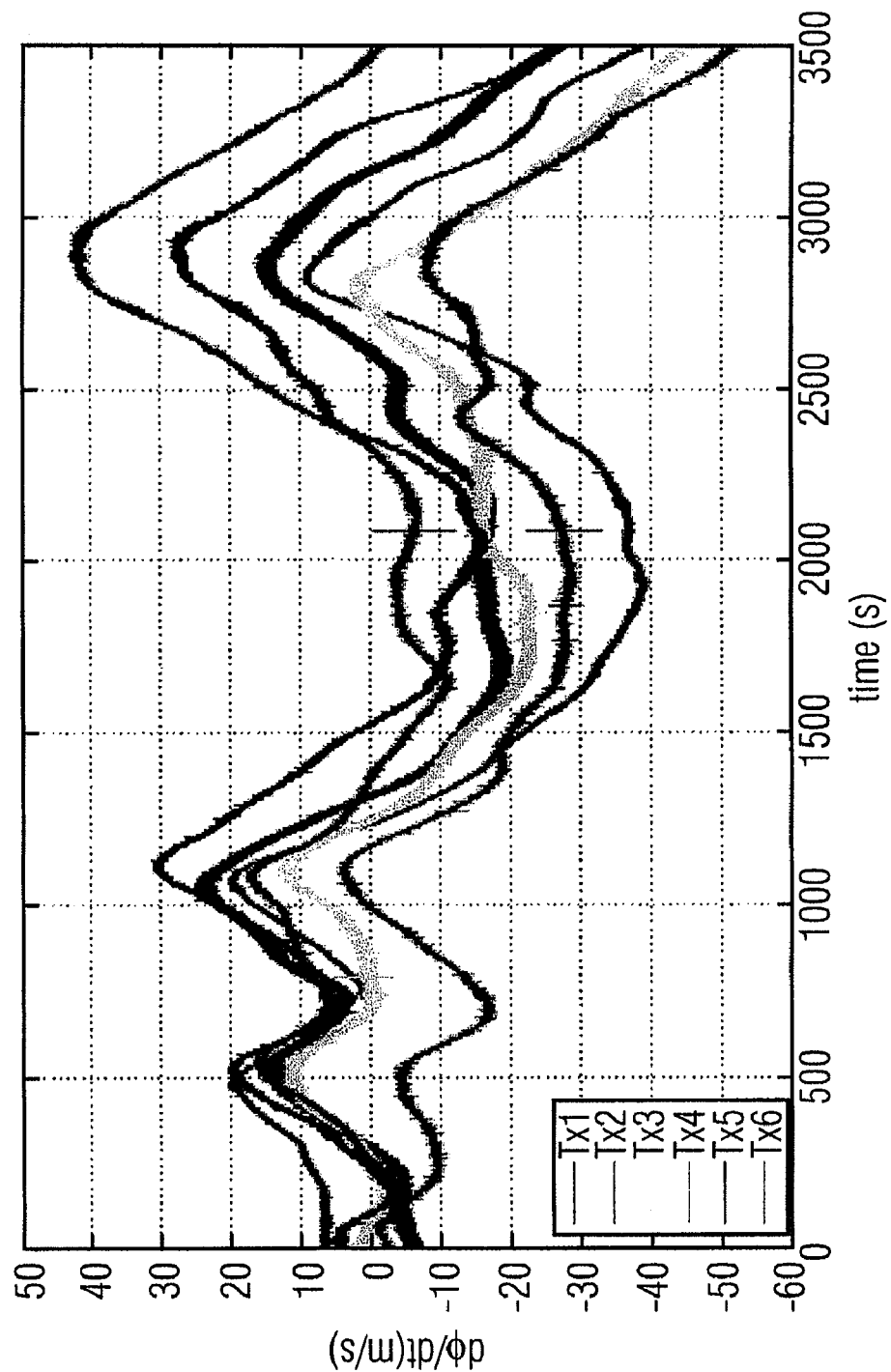
FIG. 2 shows variation of clock deviations calculated as single phase differences for six transmitters.

For six transmitters Tx1 to Tx6 of the microwave locating system, FIG. 2 shows the variation of the clock error calculated according to (8).

For convenience, the values are expressed as speed in m/s, as quite common in positioning systems like GPS. FIG. 2 clearly shows the non-deterministic nature of clock errors. Traditional techniques for time domain stability analysis of clocks use the Allan Variance as a measure of clock stability.

By the Allan Variance it is possible to identify the type of noise present in the clock errors (power-law noise identification). Before citing the definition of the Allan Variance the fractional frequency error $y(t)$ and the error phase $\delta\phi$ are defined. Fractional frequency error is the ratio of the frequency error of and the nominal frequency $f_0$. The error phase is the error in the phase produced by the frequency variations. The relationship between $y(t)$ and $\delta\phi$ is:

$$y(t) = \frac{\delta f}{f_0} = \frac{1}{2\pi f_0} \frac{\partial \delta \phi}{\partial t} \quad (10)$$

The Allan Variance is calculated as the average of the squared difference between two samples of the fractional frequency $y(t)$ taken at a distance $\tau$, where $\tau$ is the time interval between the samples i and i+$\tau$.

$$\sigma_y^2(\tau) = \frac{1}{2(M-1)} \sum_{i=1}^{M-1} (y(t_{i+1}) - y(t_i))^2 \quad (11)$$

Figure 3:
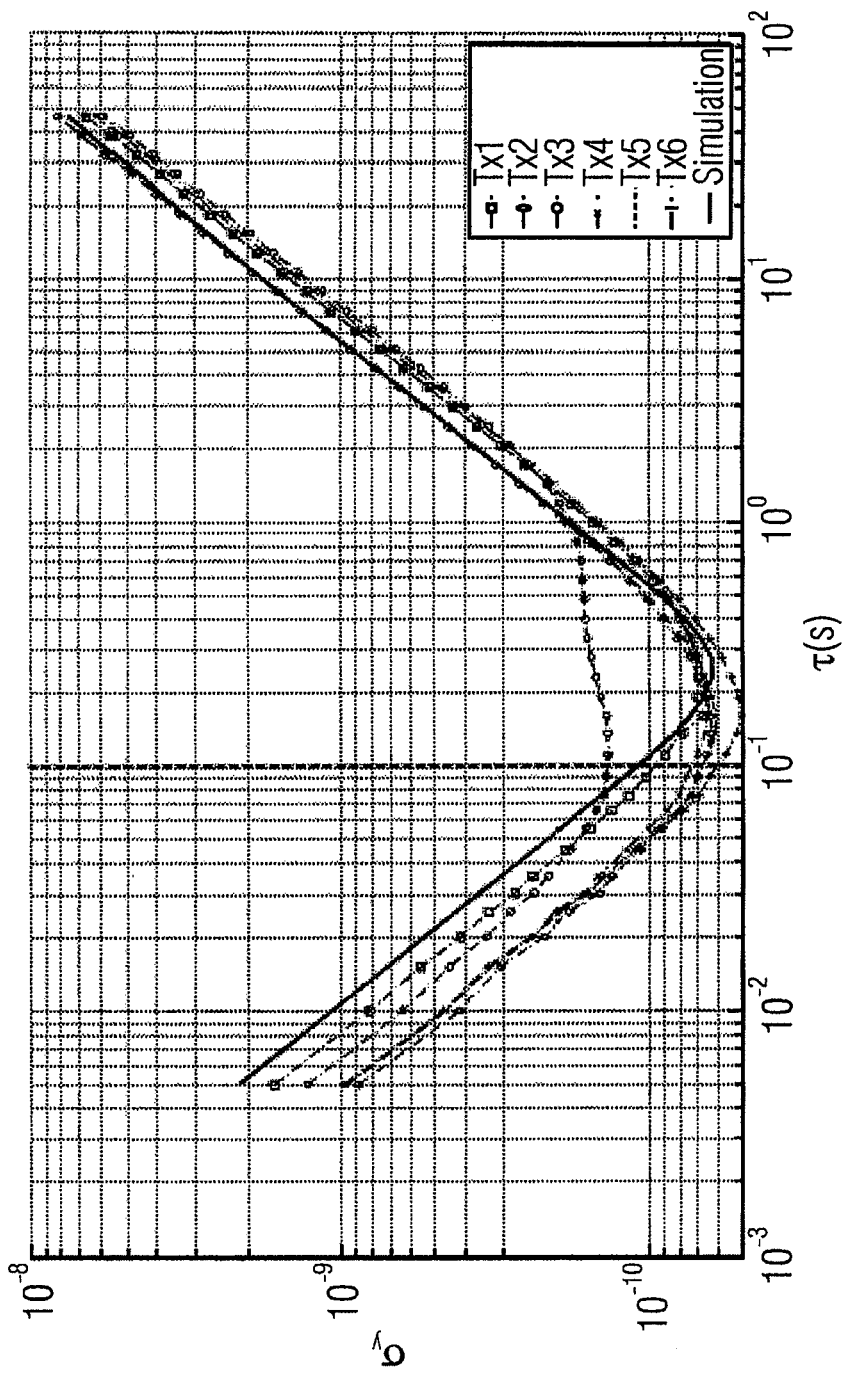
FIG. 3 shows Allan deviation of beat phase measurements for six free-running transmitters.

Allan Deviation is the square root of the Allan Variance. In setup variations of the phase error $\delta\phi$ correspond to variations of the beat phase $\phi_{bi}$ provided speed of light and distance between transmitter and (reference) receiver do not change, cf. (7). The Allan Deviation is used to identify relevant noise components of the transmitter clocks. In FIG. 3 the Allan Deviation of the signals presented before in FIG. 2 is shown. For time intervals smaller than 0.1 seconds (left of vertical line in FIG. 3) the slope of the Allan Deviation is approximately minus one. This demonstrates the predominance of flicker PM noise. The Allan Variance is closely related to the power spectral density of the fractional frequency error $y(t)$. The slope of flicker PM noise in a power density plot $S_y(f)$ is plus one, i.e. $S_y(f) \alpha f$ [8]. In this case it is hard to model the noise component by applying a filter with rational transfer function to white noise.

Instead of deriving the clock error model directly from the Allan Deviation, according to the invention, it is proposed to derive it by fitting the correlation function of the stochastic model, such as the noise model, to measured autocorrelation functions.

Figure 4:
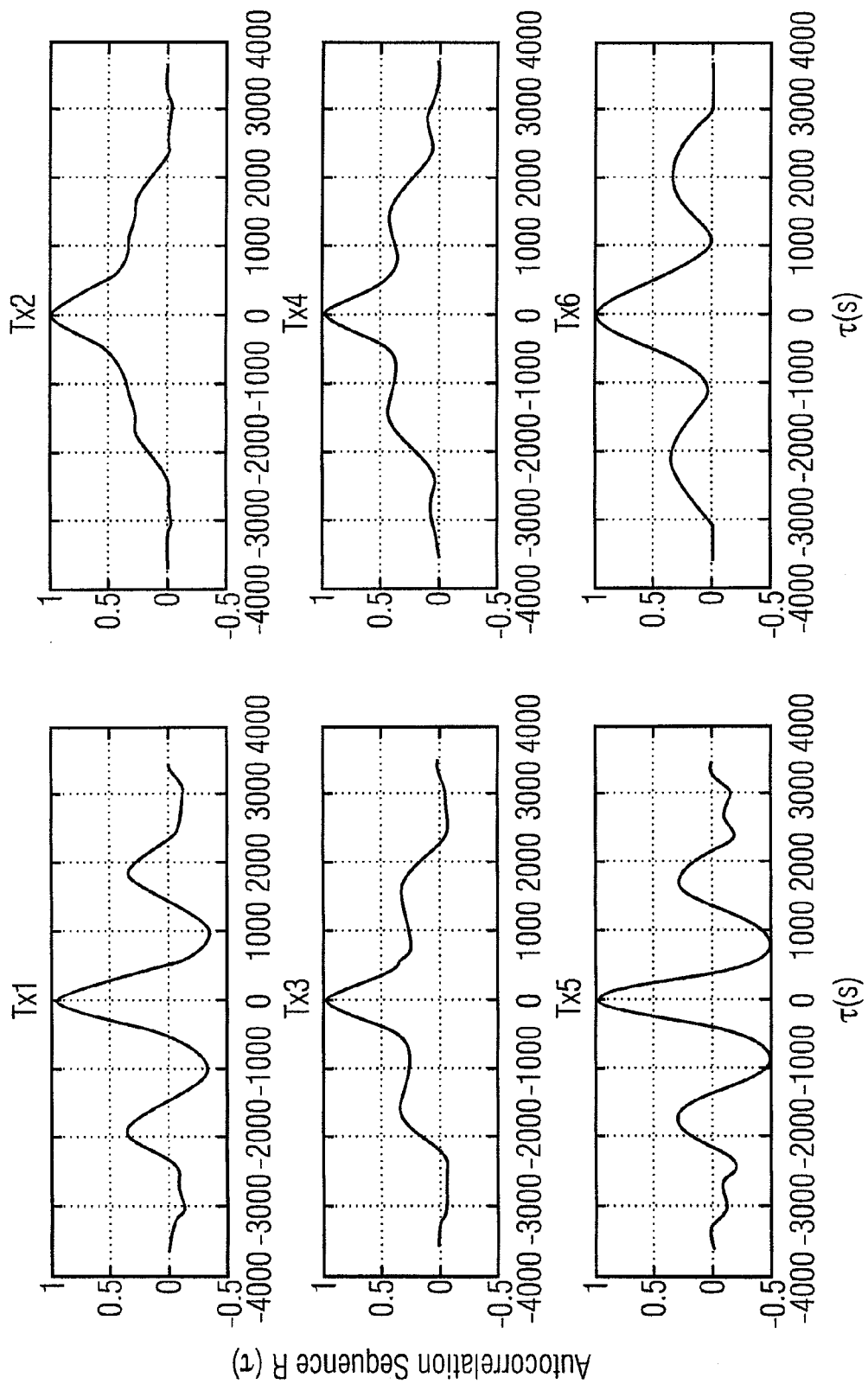
FIG. 4 shows auto correlation of clock variations for six transmitters.

In FIG. 4 measured autocorrelation functions for the six transmitter clocks Tx1 to Tx6 are shown. They resemble the autocorrelation function of flicker PM noise given in Table 2 of [7]. They are also very similar to correlation functions of second order Markov processes. Second order Markov processes are characterized by an attenuation factor $\zeta$ and a natural frequency $\omega_n$. Their transfer function and the corresponding correlation function are given in [9]:

$$H(s) = \frac{as + b}{s^2 + 2\zeta\omega_n s + \omega_n^2}. \quad (12)$$

$$R(\tau) = \frac{\sigma^2}{\cos\theta} e^{\zeta\omega_n|\tau|} \cos\left[\sqrt{1-\zeta^2}\,\omega_n|\tau| - \theta\right] \quad (13)$$

The parameters $\sigma$ and $\theta$ are constants. Taking a=0 and fitting the autocorrelation function of the Markov model to the functions presented in FIG. 4, values for the parameters $\zeta$ and $\omega_n$ were obtained. The parameters $\zeta$ and $\omega_n$ determine on the one hand the frequency of the oscillations and the size of the secondary peaks in the correlation functions and on the other hand the poles of the transfer function, which define the form of power spectral density.

In FIG. 3 the Allan Deviation of simulated data is shown (solid line) for a second order Markov process modeling the clock deviations as just described. Clearly, the simulated clock deviations can model properly the behavior observed in the real data including the flicker PM noise component.

II. KALMAN FILTER

This section describes the state variable representation of the model presented in the Section I and shows the development of the Kalman Filter equations. In general, the state space representation of a linear system used in a Kalman filter is described by a state equation (14) and an observation equation (15).

$$\dot{X}(t)=FX(t)+W(t) \quad (14)$$

$$Z(t)=HX(t)+V(t) \quad (15)$$

X represents the state vector, F the system matrix, W process noise, Z the measurement vector, H the output matrix and V the measurement noise.

For the clock model the absolute clock error $\delta t_i$, its derivative $\dot{\delta t_i}$ and the second derivative $\ddot{\delta t_i}$ were chosen as state variables.

$$X_i=[\delta t_i \dot{\delta t_i} \ddot{\delta t_i}]^T \quad (16)$$

The system matrix F takes the form in (17). The last two lines in this matrix correspond to the second order Markov model for the variation of the clock deviation, as described in Section I.

$$F = \begin{bmatrix} 0 & 1 & 0 \\ 0 & 0 & 1 \\ 0 & -\omega_n^2 & -\zeta\omega_n \end{bmatrix} \quad (17)$$

Measurements of the absolute clock deviation $\delta t_i$ were calculated using (2). The transmitter is programmed to send brief sequences with a period $T_i$. Therefore, the transmit time at the transmitter $t_i$ can be replaced by $K \cdot T_i$, where the integer K is a counter indicating the number of sent sequences. Single phase differences as calculated in (9) were taken as measurements of the clock error variation. The measurement vector and the corresponding output matrix take the form:

$$Z_i = \begin{bmatrix} t_{ri} - K \cdot T_i - \frac{d_{ri}}{c} \\ \Delta\phi/\Delta t \end{bmatrix} \quad (18)$$

$$H = \begin{bmatrix} 1 & 0 & 0 \\ 0 & 1 & 0 \end{bmatrix}$$

The clock state of each transmitter is estimated in the reference receiver by separate Kalman filters and transmitted to the rover. The rover uses Kalman predictors to estimate the clock deviations. The model for the predictors comprises only the state equation (14). Each time a new clock state estimate arrives at the rover the state vector of the corresponding transmitter is updated. With the estimated clock deviations the pseudo distances between transmitters and rover are calculated. These are used to estimate the rover position and the clock deviations between reference station and rover.

III. TEST PLATFORM

The test platform used to generate data in order to verify the algorithms comprises a simulation tool and a real locating system. The simulation tool was developed in Matlab. It allows generating controlled measurements in order to proof the efficiency of the algorithms. Furthermore, the clock estimation filters for both reference station and rover as well as the position calculation were developed in Matlab. They are able to process both simulated data and data from the real system. The real system consists of a set of asynchronous free running transmitters and receivers located at known positions.

Transmitters are in charge of the generation and periodic transmission of brief code sequences in the ISM band at 2.4 GHz. Each transmitter is programmed to emit brief sequences with a period of approximately 5 ms. Twelve static receivers and six transmitters were installed around a football field. The clocks on the transmitters are low cost crystal oscillators. For all tests presented here, the receivers are synchronized by a fiber optic network to a master clock, which is based on an oven-controlled crystal oscillators (OCXO).

IV. EXPERIMENTAL RESULTS

Figure 5:
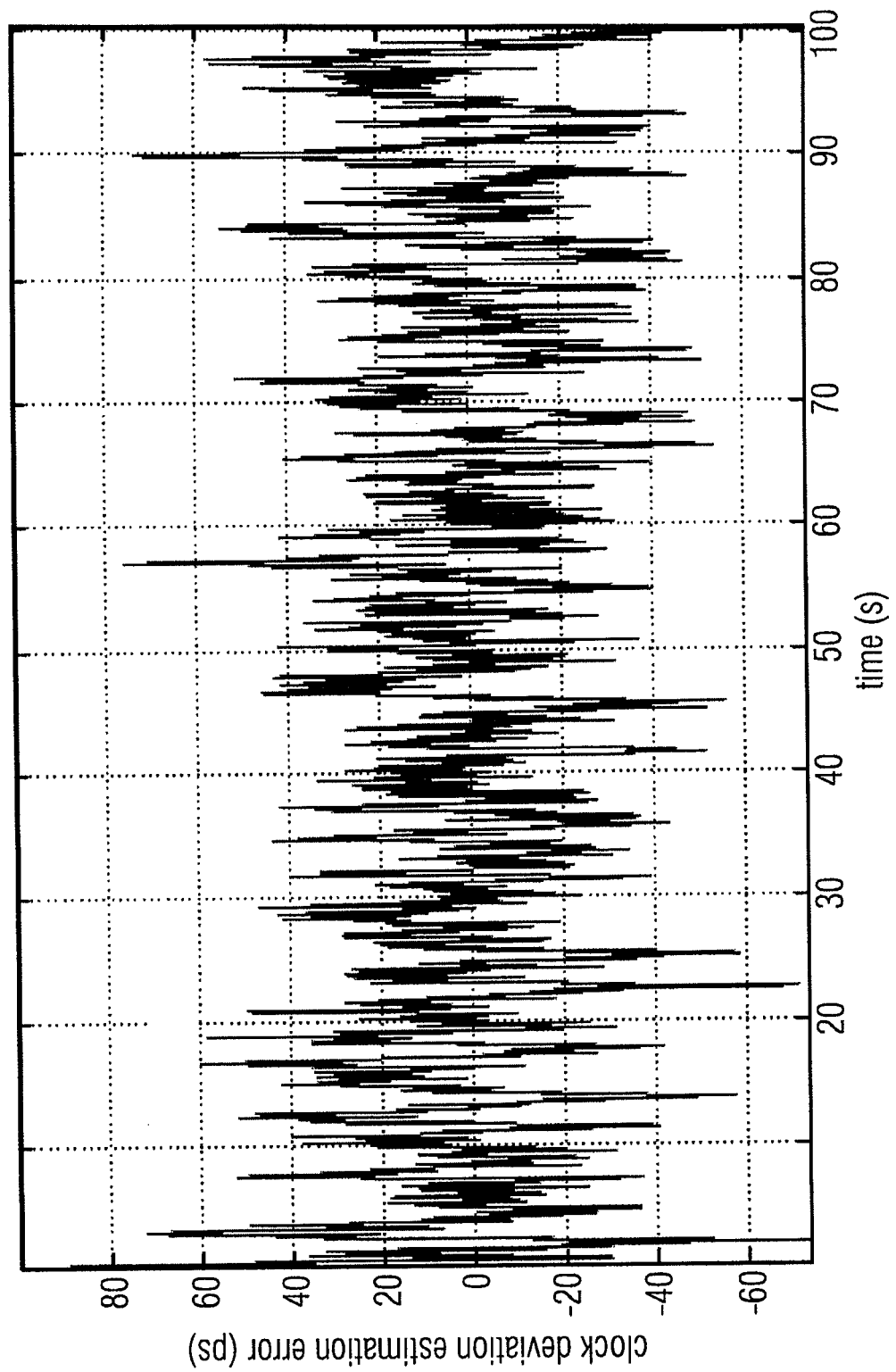
FIG. 5 shows a clock estimation error at a reference receiver.

The first goal of the experiments is to demonstrate the efficiency of the algorithms to estimate clock deviations $\delta t_i$. A set of measurements (TOAs and beat phases) for six free running transmitters and two receivers (reference station and rover) were generated using the simulation tool. The simulated reference station data are used to estimate the transmitter clock deviations. Because of simulated data, it is possible to calculate the error in the estimation. In FIG. 5 the error of one transmitter clock deviation estimation versus time at the reference station is shown. The standard deviation of measurement noise used for these simulations was 150 ps for the time measurements and 0.04 rad for the phase measurements. The noise in the clock deviation estimation is zero mean, its deviation is about 25 ps.

The synchronization strategy necessitates the reference station, which estimates the clock deviations $\delta t_i$, to process data at the same rate as signals are received. The estimated clock deviations should be transmitted at a lower rate in order to keep the data traffic between reference station and rovers at appropriate levels. Therefore, it is important to analyze the impact of the clock parameter update rate on the accuracy of the position estimates. The rovers must be able to predict the clock deviation between updates.

Figure 6:
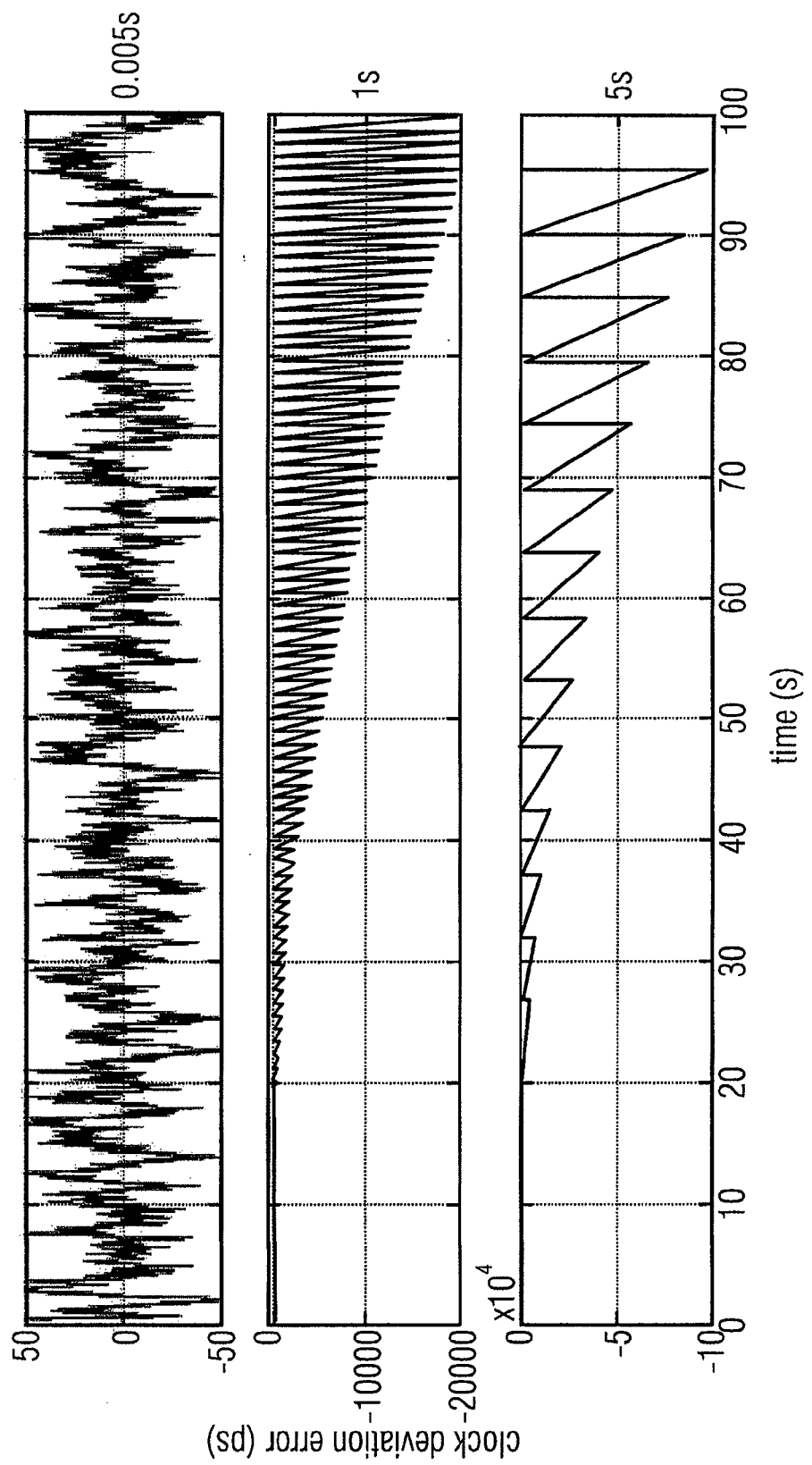
FIG. 6 shows an impact of an update time interval using estimation only at a reference receiver.

A first approach is a zero order prediction, i.e. the last clock deviation estimate received from the reference station is used until a new correction arrives at the rover. For these experiments update time intervals of 0.005, 1 and 5 seconds were chosen. FIG. 6 shows the results obtained by following this approach. The larger the update interval, the faster the errors grow up to unacceptable levels above the nanosecond range. Hence this approach is impractical for positioning with sub-meter level accuracy.

Figure 7:
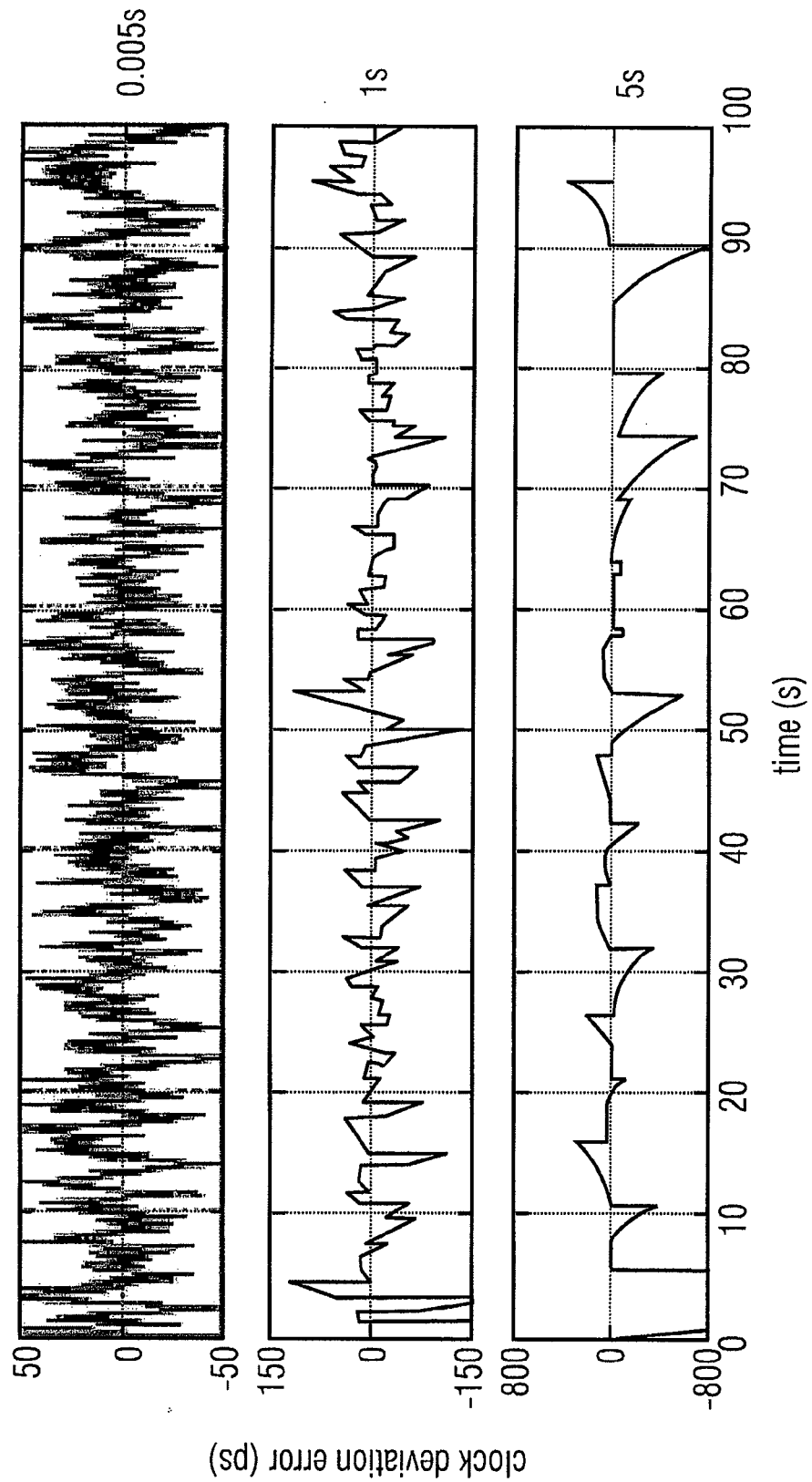
FIG. 7 shows the impact of an update time interval using an estimation at a reference receiver and at a movable object.

Another approach uses Kalman predictors at the rovers to extrapolate the transmitter clock deviations between updates received from the reference station. Both, reference station and rover use the same Kalman filter as explained at the end of Section II. Obviously the efficiency of the prediction is affected by the update rate of the correction values. This is underlined by FIG. 7, which shows clock deviation estimation errors at the rover for the three update time intervals 0.005, 1 and 5 seconds. The errors stay in a sub-nanosecond range. The superiority of the proposed approach to use Kalman predictors at the rovers is obvious.

Figure 8:
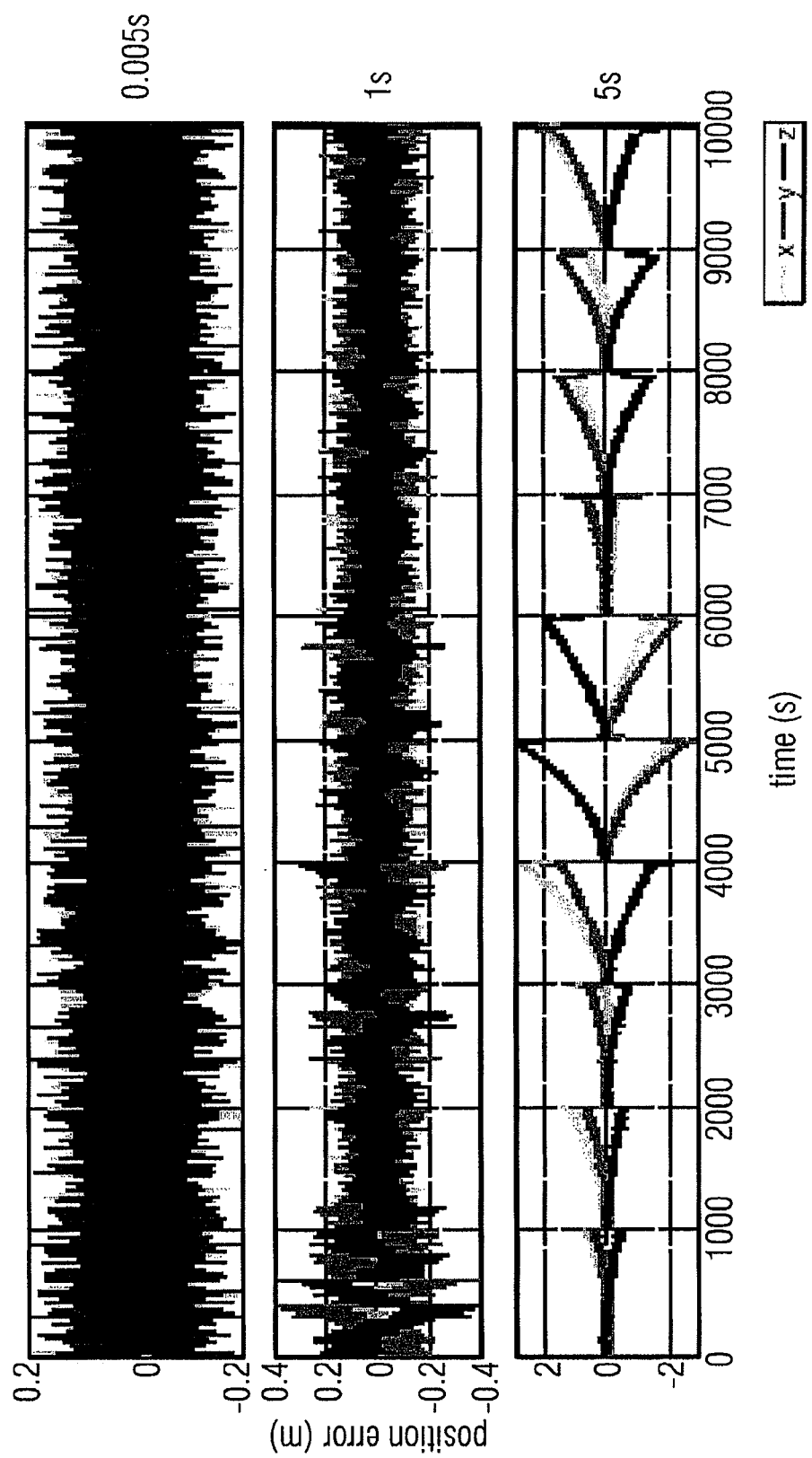
FIG. 8 shows the influence of a time interval between correction.

In FIG. 8 the effect on the positioning accuracy versus time is shown. From top to bottom the update time interval has been increased. Each subplot shows the positioning accuracy for the three coordinates X, Y, and Z. For time intervals up to one second, the estimation works in acceptable limits and there is no significant change in accuracy. The noise observed in the position is due to noise in the TOA-measurements, which have not been filtered in this experiment. For longer update intervals the error increases noticeably and peaks just before an update. It can be observed that the scaling of the vertical axis has been changed for each update interval.

Real data have been collected during one hour from the test system to check the algorithms. One of the static receivers was taken as reference station to estimate the transmitter clock model states as presented in Section II. A second receiver used the estimated states from the reference station to estimate transmitter clock deviations $\delta t_i$ like a rover. The rover TOA measurements $t_{ri}$ were corrected using the predicted transmitter clock deviations. Pseudo distances can be calculated by subtracting time of transmission estimates $K \cdot T_i$ from the rover TOA measurements.

Figure 9:
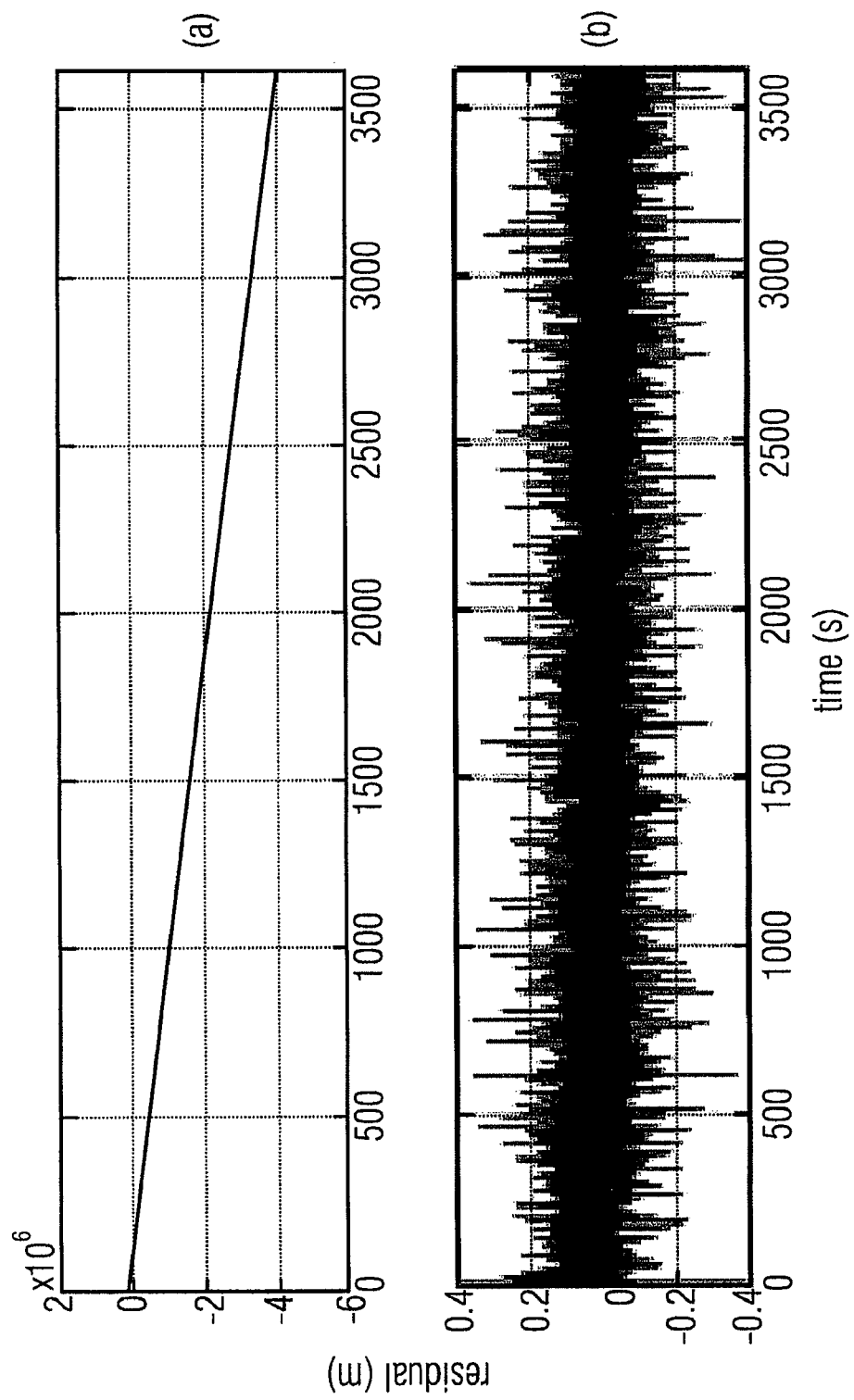
FIG. 9 shows variations of pseudo distance estimates (a) without and (b) with transmitter clock deviation correction.

FIG. 9($a$) shows how the pseudo distance estimates diverge with time if the transmitter clock deviations are not modeled, i.e. the rover TOA measurements are not corrected to take into account the transmitter clock deviation. After one hour the pseudo distance estimates have decreased by $4 \cdot 10^6$ m though the distance between rover and transmitter did not change. FIG. 9($b$) shows the corresponding result if the rover TOA measurements are corrected. The algorithm is able to compensate the transmitter clock errors, the pseudo distance estimates vary only in the decimeter range. It is clear that without the correction of the transmitter clock deviation the calculation of a reasonable position estimate by the rover would be impossible.

V. CONCLUSION

For a microwave locating system a method has been proposed to synchronize virtually all transmitters and receivers in the system without explicitly coupling them to a master clock. To this end, a stochastic model for accurately estimating clock deviations has been devised. The modeling starts from measured autocorrelation functions instead of exploiting traditional power-law measures for noise identification as, e.g., the Allan Deviation. The autocorrelation method allows the design of stable filters. This model is able to reflect the behavior of low cost oscillators characterized by flicker PM noise and other noise components. The stochastic model may be exploited in both reference receiver and rovers. In the reference receiver, a set of Kalman filters, one for each transmitter, estimates the transmitter clock deviations using TOA and beat phase measurements. In the rover, Kalman predictors forecast the clock deviations between correction updates. By simulations based on measured data, the superiority of the Kalman predictor compared to a zero order predictor was demonstrated. Furthermore, this approach has been shown to be adequate to provide accurate position estimates in the submeter range as long as the update time interval stays below one second. The algorithms were tested also with real data collected in the microwave locating system. The effectiveness to compensate transmitter clock deviations was demonstrated. Without such a strategy it would be impossible to calculate reasonable position estimates.

Accordingly, embodiments of the invention relate to a virtual synchronization of low-cost free-running transmitter clocks in a microwave locating system. The synchronization strategy may be based on modeling the transmitter clocks. A stable stochastic model may be designed by analyzing the correlation function of the observables in the locating system, i.e. time of arrival and carrier phase. In embodiments of the invention, this model is exploited in a Kalman filter and a reference receiver estimates the current clock states and distributes them periodically to the mobile receivers enabling them to predict the transmitter clock deviations between updates. Referring to FIGS. 6 to 9, the impact of such a synchronization scheme on the position accuracy using both simulated and real data was analyzed.

Depending on certain implementation requirements, embodiments of the invention can be implemented in hardware or in software. The implementation can be performed using a digital storage medium, in particular a disk, DVD or a CD having electronically readable control signals stored thereon, which cooperate with a programmable computer system such that the inventive methods are performed. Generally, embodiments of the invention may be a computer program product with a program code stored on a machine readable carrier, the program code being operative for performing the inventive methods when the computer program product runs on a computer. In other words, embodiments of the inventive methods may be implemented as a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] D. Yun and C. Kee, "Centimeter accuracy stand-alone indoor navigation system by synchronized pseudolite constellation," Proceedings of the 15$^{th}$ International Technical Meeting of the Satellite Division of the Institute of Navigation ION GPS, pp. 213-225, September 2002.

[2] J. Barnes, C. Rizos, J. Wang, D. Small, G. Voigt, and N. Gambale, "High Precision Indoor and Outdoor Positioning using LocataNet," Journal of Global Positioning Systems, vol. 2, no. 2, pp. 73-82, 2004.

[3] L. Galleani, L. Sacerdote, P. Tavella, and C. Zucca, "A mathematical model for the atomic clock error," METROLOGIA BERLIN-, vol. 40, no. 3, pp. 257-264, 2003.

[4] J. Wright, "GPS Composite Clock Analysis," Time, vol. 8, no. 6, p. 4.

[5] F. Gonzalez and P. Waller, "Short term GNSS clock characterization using One-Way carrier phase," pp. 517-522, 2007.

[6] P. Daly and I. Kitching, "Characterization of NAVSTAR GPS and GLONASS on-board clocks," Aerospace and Electronic Systems Magazine, IEEE, vol. 5, no. 7, pp. 3-9, 1990.

[7] W. Riley and C. Greenhall, "Power Law Noise Identification Using the Lag 1 Autocorrelation," in Proc. 18th European Frequency and Time Forum (Guildford, UK), 2004.

[8] T. Parker, "Characteristics and Sources of Phase Noise in Stable Oscillators," pp. 99-110, 1987.

[9] M. Grewal and A. Andrews, Kalman Filtering: Theory and Practice Using MATLAB. Wiley, 2001.

The invention claimed is:

1. A method for estimating a deviation between a free-running transmitter clock and a reference clock, the method comprising:
   at a receiver stationary with respect to a transmitter, receiving a transmitter signal generated by the transmitter on the basis of the transmitter clock;
   on the basis of the reference clock determining a time of arrival of the transmitter signal and a beat phase of the transmitter signals carrier; and
   on the basis of a clock error model, the time of arrival and the beat phase, estimating the deviation between the transmitter clock and the reference clock,
   wherein the clock error model is derived by fitting a correlation function of a stochastic model to a measured auto correlation function of the transmitter clock and wherein the correlation function of the stochastic model is the correlation function of a second order Markov process.

2. The method of claim 1, wherein estimating the deviation comprises:
   using a Kalman filter, wherein coefficients of the system matrix of the Kalman filter are determined based on the clock error model.

3. The method of claim 2, wherein the deviation between the free-running transmitter clock and the reference clock is output as an estimated state vector of the Kalman filter.

4. The method of claim 1, comprising:
   estimating a deviation between each of a plurality of free-running transmitter clocks and the reference clock, wherein each of the free-running transmitter clocks is associated with one of a plurality of stationary transmitters spaced from each other; and
   virtually synchronizing the plurality of transmitters using the estimated deviations.

5. A method for determining a position of a movable object, comprising:
   at the movable object, receiving an estimated deviation between each transmitter clock of a plurality of transmitters and a reference clock of a receiver stationary with respect to the plurality of transmitters and receiving signals generated based on the free-running transmitter clocks from the plurality of transmitters, and
   calculating the position of the movable object using a time of arrival of the received signals from the plurality of transmitters and transmission times of the received signals corrected by the estimated deviations,
   wherein the deviations are estimated state vectors of a Kalman filter used in the stationary receiver, and wherein the movable object calculates extrapolated deviations using the estimated state vectors in a state equation of a Kalman filter corresponding to the Kalman filter used in the stationary receiver, and
   wherein the movable object calculates the extrapolated deviations in a time period between subsequent estimated state vectors received from the stationary receiver.

6. An apparatus for estimating a deviation between a free-running transmitter clock and a reference clock, comprising:
   a receiver configured to receive a transmitter signal generated by a transmitter stationary with respect to the receiver, on the basis of the transmitter clock;
   a processor configured to:
      on the basis of the reference clock, determine a time of arrival of the transmitter signal and a beat phase of the transmitter signals carrier; and
      on the basis of a clock error model, the time of arrival and the beat phase, estimate the deviation between the transmitter clock and the reference clock,
      wherein the clock error model is derived by fitting a correlation function of a stochastic model to a measured auto correlation function of the transmitter clock and wherein the correlation function of the stochastic model is the correlation function of a second order Markov process.

7. An apparatus for determining a position of a movable object, comprising:
   a receiver configured to receive estimated deviations between each transmitter clock of a plurality of transmitters and a reference clock of a receiver stationary with respect to the plurality of transmitters, and to receive signals generated based on the free-running transmitter clocks from the plurality of transmitters, and
   a processor configured to calculate the position of the movable object using a time of arrival of the received signals from the plurality of transmitters and transmission times of the received signals corrected by the estimated deviations,
   wherein the deviations are estimated state vectors of a Kalman filter used in the stationary receiver, and wherein the processor is configured to calculate extrapolated deviations using the estimated state vectors in a state equation of a Kalman filter corresponding to the Kalman filter used in the stationary receiver, and
   wherein the processor is configured to calculate the extrapolated deviations in a time period between subsequent estimated state vectors received from the stationary receiver.

8. A movable object comprising an apparatus for determining a position of a movable object, comprising: a receiver configured to receive estimated deviations between each transmitter clock of a plurality of transmitters and a reference clock of a receiver stationary with respect to the plurality of transmitters, and to receive signals generated based on the free-running transmitter clocks from the plurality of transmitters, and a processor configured to calculate the position of the movable object using a time of arrival of the received signals from the plurality of transmitters and transmission times of the received signals corrected by the estimated deviations,
   wherein the deviations are estimated state vectors of a Kalman filter used in the stationary receiver, and wherein the processor is configured to calculate extrapolated deviations using the estimated state vectors in a state equation of a Kalman filter corresponding to the Kalman filter used in the stationary receiver, and wherein the processor is configured to calculate the extrapolated deviations in a time period between subsequent estimated state vectors received from the stationary receiver.

9. A system comprising a plurality of stationary transmitters spaced from each other, an apparatus for estimating a deviation between a free-running transmitter clock and a reference clock, comprising: a receiver configured to receive a transmitter signal generated by a transmitter stationary with respect to the receiver, on the basis of the transmitter clock; a processor configured to: on the basis of the reference clock, determine a time of arrival of the transmitter signal and a beat phase of the transmitter signals carrier; and on the basis of a clock error model, the time of arrival and the beat phase, estimate the deviation between the transmitter clock and the reference clock, wherein the clock error model is derived by fitting a correlation function of a stochastic model of a second order Markov process to a measured auto correlation function of the transmitter clock, which is stationary with respect to the transmitters, and a movable object comprising an apparatus for determining a position of a movable object, comprising: a receiver configured to receive estimated deviations between each transmitter clock of a plurality of transmitters and a reference clock of a receiver stationary with respect to the plurality of transmitters, and to receive signals generated based on the free-running transmitter clocks from the plurality of transmitters, and a processor configured to calculate the position of the movable object using a time of arrival of the received signals from the plurality of transmitters and transmission times of the received signals corrected by the estimated deviations.

10. A non-transitory computer-readable medium having stored thereon a computer program comprising program code for performing, when running on a computer, a method for estimating a deviation between a free-running transmitter clock and a reference clock, the method comprising: at a receiver stationary with respect to a transmitter, receiving a transmitter signal generated by the transmitter on the basis of the transmitter clock; on the basis of the reference clock determining a time of arrival of the transmitter signal and a beat phase of the transmitter signals carrier; and on the basis of a clock error model, the time of arrival and the beat phase, estimating the deviation between the transmitter clock and the reference clock, wherein the clock error model is derived by fitting a correlation function of a stochastic model to a measured auto correlation function of the transmitter clock and wherein the correlation function of the stochastic model is the correlation function of a second order Markov process.

* * * * *